United States Patent

[11] 3,569,850

[72] Inventors Rolf Wegener
Hannover;
Werner Backnick, Bredenbeck, Hannover;
Werner Heitefuss, Hannover, Germany
[21] Appl. No. 585,838
[22] Filed Oct. 11, 1966
[45] Patented Mar. 9, 1971
[73] Assignee Telefunken Patentverwertungsgesellschaft m.b.H.
Ulm/Danube, Germany
[32] Priority Oct. 13, 1965, June 8, 1966
[33] Germany
[31] T29565 and T31320

[54] HIGH FREQUENCY AMPLIFIER WITH LINE CIRCUITS
10 Claims, 5 Drawing Figs.

[52] U.S. Cl. .......... 330/56, 330/21
[51] Int. Cl. .......... N03f 3/60
[50] Field of Search .......... 330/7, 53, 56, 21; 334/15

[56] References Cited
UNITED STATES PATENTS
3,209,358 9/1965 Felsenheld .......... 343/745
3,246,266 4/1966 Racy .......... 334/15X
FOREIGN PATENTS
977,693 12/1964 Great Britain .......... 330/7
OTHER REFERENCES
German periodical " Funkschau" No. 8, page 184 1960 (330—65)

*Primary Examiner*—Nathan Kaufman
*Attorney*—Spencer & Kaye

ABSTRACT: A high frequency amplifier has a line circuit which is resonant at some selected frequency, and which line circuit includes a variable capacitive diode means arranged to tune the line circuit, and a series resonant circuit which includes the said diode means and has a resonant frequency different from said resonant line circuit. The said series circuit includes an inductive means connected in series with said diode means.

INVENORS
Rolf Wegener
Werner Bachnick &
Werner Heitefuss
BY Spencer & Kaye
ATTORNEYS INVENTORS
Rolf Wegener
Werner Bachnick &
Werner Heitefuss
BY Spencer & Kaye
ATTORNEYS Patented March 9, 1971 3,569,850

4 Sheets-Sheet 3

INVENTORS
Rolf Wegener
Werner Bachnick &
Werner Heltefuss

BY Spencer & Kaye
ATTORNEYS

Patented March 9, 1971 3,569,850

4 Sheets-Sheet 4

INVENTORS
Rolf Wegener
Werner Bachnick &
Werner Heitefuss
BY Spencer & Kaye
ATTORNEYS

HIGH FREQUENCY AMPLIFIER WITH LINE CIRCUITS

The present invention relates generally to a high frequency amplifier with line circuits, and more particularly, to high frequency amplifiers having resonant frequency line circuits.

In such high frequency circuits, it is known to use sharply tuned capacitive diodes. Such amplifiers may have to be tuned throughout several frequency ranges which are separated from each other. For example, bands IV/V may use capacitive diodes for this purpose.

Line circuits for such amplifiers are generally constructed out of half-wave or quarter-wave lines. The half-wave lines are more expensive than quarter-wave lines and introduce the difficulty that the intermediate frequency transmission characteristic of the receiver is influenced by the position of the rotary capacitors used. This problem is not found in the quarter-wave tuners so that the quarter-wave tuners have generally been utilized in conventional UHF-amplifiers.

However, with quarter-wave line circuits tuned by means of capacitive diodes, the self-inductance of the diode may become so large that at high frequencies the size of the necessary inner conductor of the line circuit becomes so small that undesired coupling of the signal voltage results.

It is accordingly an object of the present invention to provide a new and improved high frequency amplifier.

A second object of the present invention is to provide a new and improved high frequency amplifier having half-wave line circuits.

A further object of the present invention is to provide a new and improved high frequency amplifier having line circuits wherein the line circuit is tuned by capacitive diodes.

With the above objects in mind, the present invention relates to a high frequency amplifier having a line circuit resonant at a selected frequency. It includes variable capacitive diode means arranged in circuit with the line circuit to form a tunable resonant circuit. The diode means has a self-inductance and is adapted to have its capacitance varied by voltage applied thereto. Inductive means are provided connected in series with the line circuit and with the capacitive diode means. The inductance of the inductive means together with the self-inductance of the capacitive diode means form a series resonant circuit with the capacitance of the capacitive diode means at a frequency different from the resonant frequency of the line circuit.

Additional objects and advantages of the present invention will become apparent upon consideration of the following description when taken in conjunction with the accompanying drawings in which.

Figure 1:
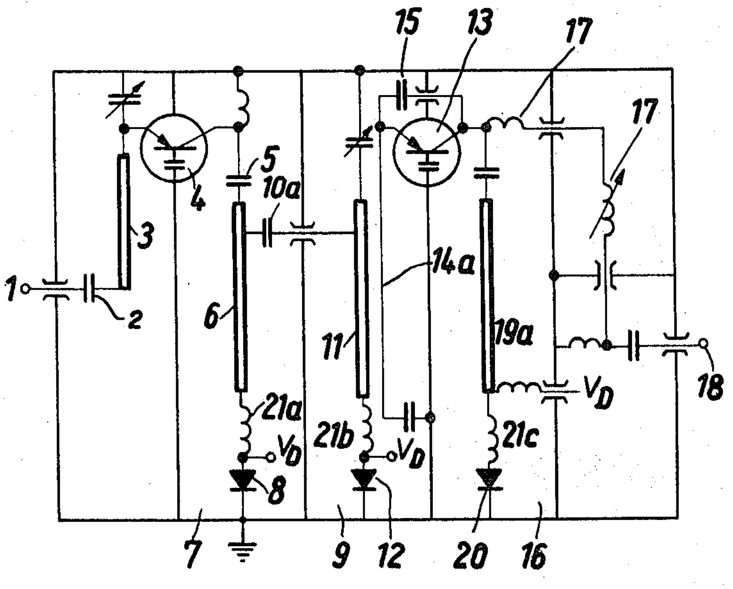
FIG. 1 is an electrical schematic diagram of a high frequency amplifier with a half-wave line circuit.

Referring to the drawings and, more particularly, to FIG. 1, the high frequency signal is applied to the input terminal 1 and to the input circuit 3 by means of a capacitor 2. The input circuit 3 is connected to the emitter electrode of a transistor 4. The operating potential source connections are not illustrated in order to avoid unnecessarily complicating the drawing.

The collector electrode of the transistor 4 is connected by means of a coupling capacitor 5 to the inner conductor 6 of a high frequency circuit 7. The resonant frequency of the high frequency line circuit 7 can be carried by means of a capacitive diode 8 which is connected between the inner conductor 6 and a reference potential such as ground.

The high frequency circuit 7 is capacitively coupled by means of a capacitor 10*a* to a secondary circuit 9 which is connected as a band pass filter. The secondary circuit 9 is provided with an inner conductor 11 that is connected to ground by means of a second capacitive diode 12. The secondary circuit 9 is connected to a transistor 13 by means of a coupling loop 14*a*. The transistor 13 is the active element of a self-oscillating mixing stage.

The feedback in the self-oscillating mixing stage is provided by the capacitor 15. The oscillator circuit is formed by the line circuit 16. Thus, the oscillator circuit is in the capacitive arm of an intermediate frequency (IF) band pass filter 17. The intermediate frequency output signal is taken from the output terminal 18.

The capacitance variation of the capacitive diode means 8, 12 and 20 is carried out by the application of a direct current voltage $V_D$ to the terminals so marked in FIG. 1.

The circuit as thus far described is similar to conventional high frequency amplifiers. Such amplifiers have the disadvantage that the capacitance variation of the diodes 8, 12 and 20 by the voltage $v_D$ takes place over a relatively small range. This requires, in prior art circuits, the use of very small voltage values in order to produce the largest possible degree of capacitance variation of the capacitive diodes to reach the required range. This produces the further disadvantage that synchronism is more difficult to maintain since the diodes are also controlled by the alternating voltages and produce a means capacitive value which is lower than that desired. Thus at the lower levels effectively no control is provided. The poor synchronism is also due to the mismatch between the oscillator stage and its preceding stage.

The above-described disadvantages are overcome in accordance with the present invention by adding inductances in series with the diodes 8, 12 and 20. Thus, it can be seen that inductors 21*a*, 21*b* and 21*c* are respectively arranged in series with the capacitive diodes 8, 12 and 20. The values of the inductors are so chosen that the total inductance of each additional inductor and the self-inductance of each of the respective diodes 8, 12 and 20 form a series resonant circuit with the capacitance of the respective diode. At the lowest resonant frequency of each line circuit, the series resonance circuits resonate at a frequency different from the resonant frequency of each of the respective line circuits. Preferably, the series resonant circuits resonate at a frequency just above the line circuit resonant frequency. Thus improved synchronism can be achieved by adjusting the values of the inductances in the band pass filter circuits to be different than the inductances in the oscillating circuit.

Figure 2:
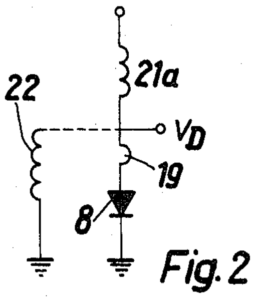
FIG. 2 is an electrical schematic diagram of a modification of the circuit of FIG. 1.

Referring now to FIG. 2, the series circuit showing the inductor 21*a* and the diode 8 is illustrated. In FIG. 2, the relatively small inductance 19 of the diode is separately illustrated to show the entire series circuit.

Figure 3:
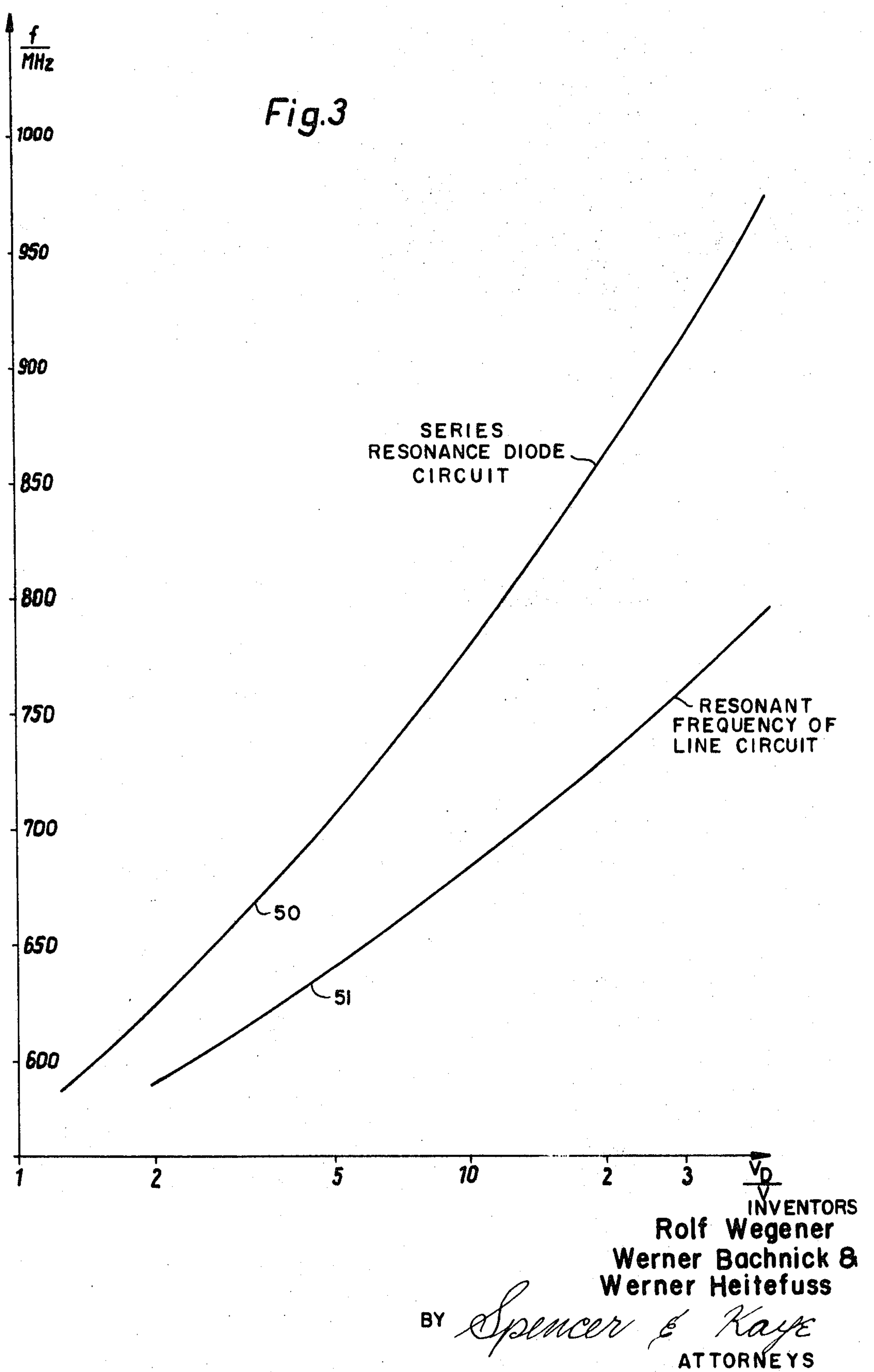
FIG. 3 is 9 graphical representation of response curves of portions of the circuit of FIG. 1.

Referring now to FIG. 3, the variation in resonant frequency for the series resonant diode circuit and for the line tank circuit are shown wherein the variation of voltage applied to the diode is shown along the horizontal or X axis and the frequency is plotted along the vertical or Y axis. From the curves of FIG. 3, it can be seen that the series resonant curve 50 just exceeds the resonant frequency of the tuned line circuit curve 51, particularly at the lowest frequency ranges or where the lowest voltages are applied.

Figure 4:
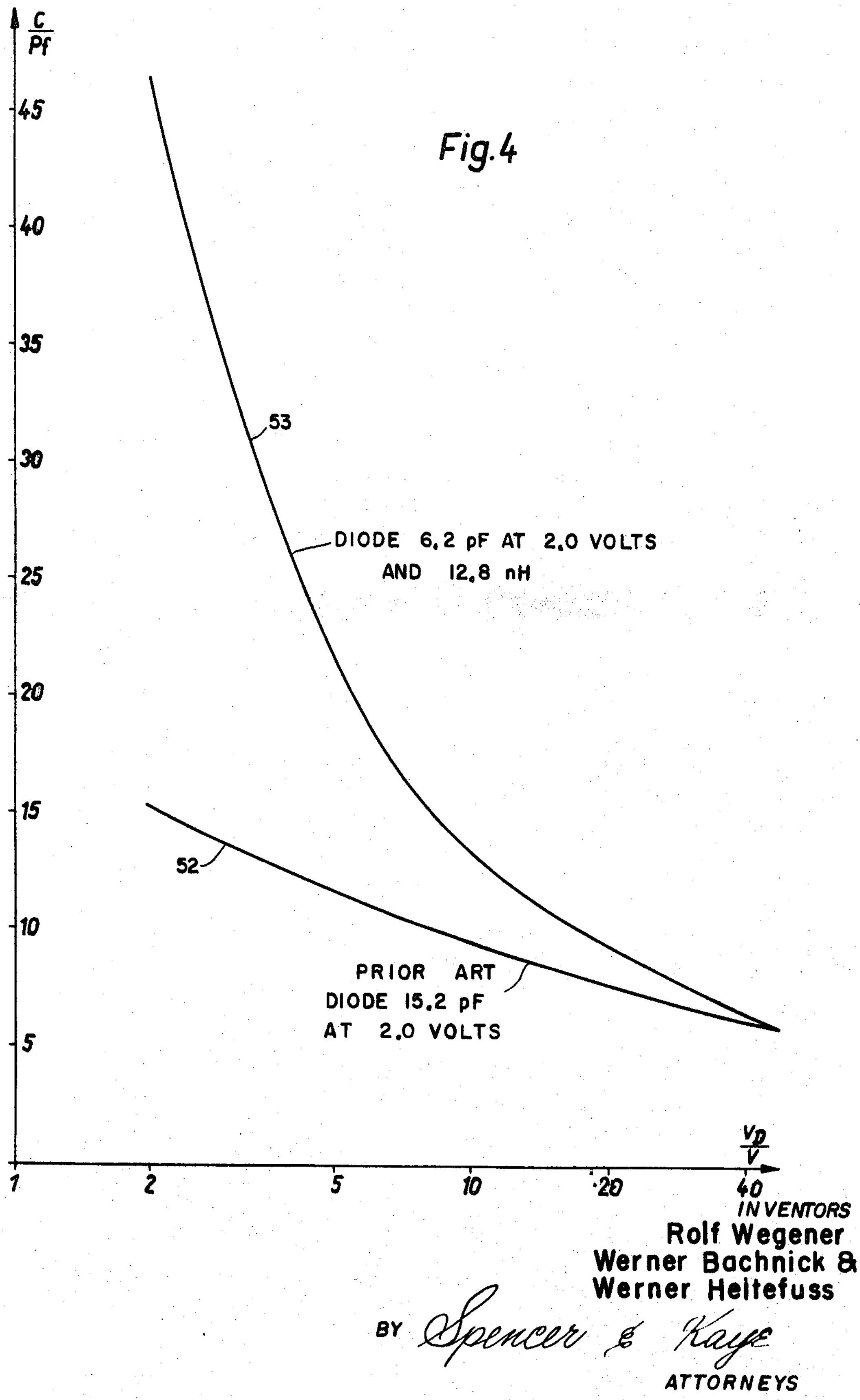
FIG. 4 is a graphical representation showing the capacitance variation of a diode arrangement in the prior art circuit as compared to the capacitance variation in the circuit constructed in accordance with the principles of the present invention.

Referring now to FIG. 4, the variation of the capacitance for the prior art circuit is shown by the curve 52 while the variation of capacitance with the circuit incorporating the principles of the present invention is shown in the curve 53. That is, the voltage applied to the diode is plotted along the horizontal or X axis and the capacitance in picofarads is plotted along the vertical or Y axis.

For these curves, the total inductance of the inductors 19 and 21*a* equals 12.8 *nh. (nanohenries). Thus, for the circuit incorporating the principles of the present invention, the circuit is tunable through a frequency range of* 590—800 mc. The capacitance variation of the diode in the conventional circuits produces only a frequency variation of 670—800 megacycles.

The circuit can also be used for higher frequencies if a further inductance is arranged in parallel with the diode 8. This is shown in FIG. 2 with the inductor 22 connected by dotted lines.

Figure 5:
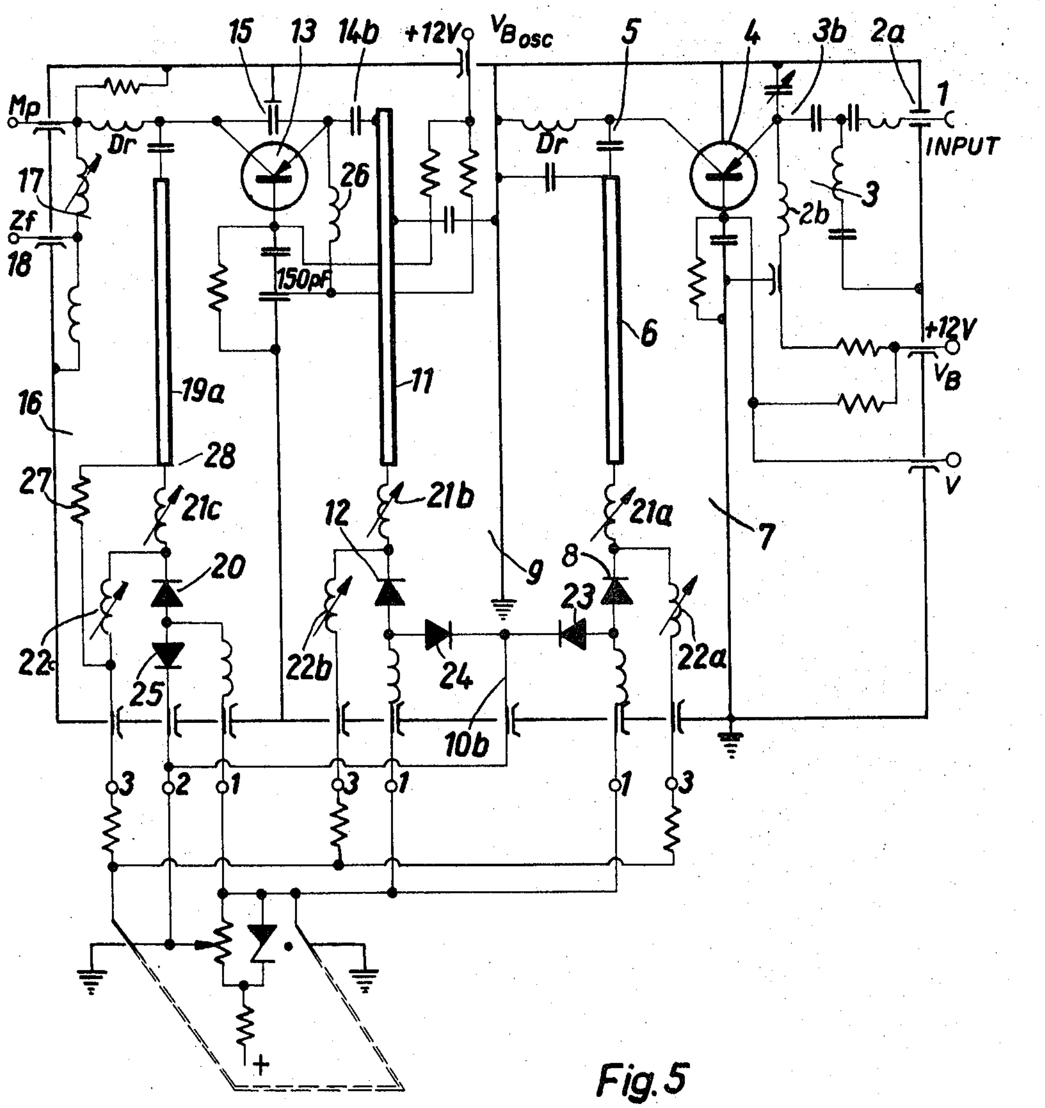
FIG. 5 is an electrical schematic diagram of an additional embodiment constructed in accordance with the principles of the present invention.

Referring now to FIG. 5, a second embodiment of the present invention is illustrated. In this second embodiment, the elements having the same function are provided with the same numerals. In this circuit, the high frequency signal is also applied to the input terminal 1 and from there to an input circuit 3 and the emitter electrode of the transistor 4.

In the arrangement of FIG. 5, the impedance of the additional inductances 21*a*, 21*b* and 21*c* and that of the self-inductance of the diodes 8, 12 and 20, as well as the other elements between the inner conductors 6, 11 and 19*a* and ground is so chosen that the series resonance frequency, due to the change of capacitance of each of the line circuits, lies below the lowest frequency range of each of the loaded line circuits and just above the high frequency range of the resonant frequency of the line circuits. In this way, an improved synchronism between the values of the inductances in the band pass filter circuits as well as in the oscillator circuits can be achieved.

By connecting additional inductors 22*a*, 22*b* and 22*c* in parallel to diodes 8, 12 and 20, respectively, the frequency range of the circuit can be increased. This is similar to the arrangement shown in FIG. 2.

An even larger frequency range can be achieved if the diodes 8, 12 and 20 each have a further diode 23, 24 and 25, respectively, connected thereto which is reversible such that either one or both diodes can have their respective capacitances varied. The relative position of the series resonance frequency would, for example, thereby be achieved when one of the diodes having the largest capacitance range (*n* 0.5) is coupled with a second diode, having correspondingly different capacitance values.

In order to avoid an undesired oscillation in the first amplifier stage, having the transistor 4, at a frequency determined by the impedances 8, 21*a*, 22*a* and 23, a choke coil 2*b* which approximates a short circuit for this frequency is provided. In the self-oscillating mixer stage of the amplifier the equivalent choke coil 26 which, in this stage, must have a larger value, could cause a similar unwanted oscillation with the parallel resonant frequency of the impedances provided by the elements 20, 21*c*, 22*c* and 25. This undesired oscillation is avoided by providing a damping resistor 27 in parallel with this impedance. The connecting point of this damping resistor 27 to the resonant circuit is preferably selected so that it corresponds to a nodal point in the frequency range when the circuit is in series resonance. In this manner, the resistor 27 linearly equalizes the amplitude response of the circuit. Good results will also be achieved if the connection point of the resistor 27 is disposed between the connecting point 28 of the inner conductor 19*a* and the inductor 21*c* and the node which corresponds to the highest oscillator frequency.

A practical tested embodiment of the present invention has been constructed utilizing the following basic values:

| | |
|---|---|
| Diodes **8, 12, 20** | BA **149** ($C_{2V}$ 7 pF) (Telefunken type) |
| Diodes **23, 24, 25** | BA **149** ($C_{2V}$ 5 pF) (Telefunken type) |
| Tuning Range | 470—860 megacycles (where $V_D$ equals 2...50V) |
| **21***a, b, c* | approximately 25 *nh*. |
| **22***a, b, c* | approximately 60 *nh*. |
| **27** | 1.2 Kilohms |
| Transistor **4** | AF **239** (Telefunken type) |
| Transistor **13** | AF **139** (Telefunken type) |

The apparatus incorporating the principles of the present invention can be used to good advantage in the stripline technique because of its low characteristic impedance. By using carrier material having a high E, the size of the components can be reduced so that the circuit can be constructed by using integrated circuit techniques. The carrier material can be made from $Al_2O_3$ for the conductors, capacitance and resistors while the amplifiers can be made from semiconductor wafers which are directly impressed on the ground plate and controlled. In this technique, the walls of the resonance circuit can be dispensed with and the circuit would be built between the inner conductor on the one side and the conducting rear side of the plate on the other side.

It will be understood that the above description of the present invention is susceptible to various modifications, changes, and adaptations, and the same are intended to be comprehended within the meaning and range of equivalents of the appended claims.

We claim:

1. In a high frequency amplifier having a plurality of interconnected stages having line circuits, including inner and outer conductors, resonant at one or more selected frequencies, the improvement wherein at least some of said resonant line circuits further include:

variable capacitive diode means connected in said line circuit for tuning the resonant line circuit, said diode means having a self-inductance and being adapted to have its capacitance varied by a voltage applied thereto, said diode means being connected between ground and one end of the inner conductor of the line circuit, the other end of which is coupled to an electrode of the active element of the respective stage of said amplifier;

a coil connected in series with said diode means and the inner conductor of said line circuit so that the inductance of said coil and the self-inductance of said diode means forms a series resonant circuit with the capacitance of said diode means; the inductance of said coil and the capacitance of said diode means being such that the resonant frequency of said series resonant circuit differs from that of said resonant line circuit for a given capacitive value of said diode means; and means for applying a voltage to said diode means to vary the capacitance thereof and thus simultaneously vary the resonant frequency of both said series resonant circuit and said resonant line circuit.

2. A high frequency amplifier as defined in claim 12 wherein said series resonant circuit is resonant at a frequency just above the resonant frequency of said line circuit.

3. A high frequency amplifier as defined in claim 1 wherein a second coil is connected in parallel with said capacitive diode means whereby the frequency range of said resonant line circuit is further increased.

4. A high frequency amplifier as defined in claim 1 wherein a choke coil is connected to the input electrode of said active element of said amplifier stage, the impedance of said choke coil cooperating with the impedance of said series resonant circuit and having such a value of inductance so as to form a short circuit to ground for undesired parallel resonant frequencies.

5. A high frequency amplifier as defined in claim 1, wherein said resonant line circuit having said series resonant circuit is in the oscillator stage of said amplifier and wherein resistive means are connected between a point on said line circuit and ground potential for linearizing the response of the amplifier.

6. A high frequency amplifier as defined in claim 5 wherein said point on said line circuit to which said resistive means is connected represents a nodal point in the frequency response of said line circuit.

7. A high frequency amplifier as defined in claim 1, wherein the values of the parts of said series resonant are chosen so that the resonant frequency of the series resonant circuit is lower than the resonant frequency of the line circuit at its lowest frequency limit and higher than the resonant frequency of the line circuit at its highest frequency limit.

8. A circuit in which high frequency electric oscillations are tuned in frequency comprising, in combination:

a. a line circuit which resonates at a characteristic frequency and including a variable capacitive diode means connected between one end of the inner conductor of said line circuit and ground, the other end of said inner conductor being connected to the output electrode of a transistor;

b. a series resonant circuit including said capacitive diode means and a coil connected in series with said diode means and said one end of said inner conductor, said resonant circuits being such that the tuning thereof follows a slope which is greater for said series resonant circuit than for said resonant line circuit; and c. means for tuning said resonant circuits including means for varying the capacitance of said capacitive diode means to simultaneously vary the resonant frequency of both of the said resonant circuits.

9. A circuit as defined in claim 8 including an interconnected plurality of said resonant line circuits, each of said line circuits including a variable capacitive diode means and each having a series resonant circuit formed by inductive means connected in series with said diode means and the inner conductor of said line circuit.

10. A circuit as defined in claim 8 wherein the said diode means is connected to a nodal point to of the inner conductor at the node which corresponds to the highest oscillator frequency.